No. 708,119.     Patented Sept. 2, 1902.

J. T. BRAYTON.
SIGHT FOR FIREARMS.
(Application filed May 18, 1901.)

(No Model.)

Witnesses:
J. B. McGirr.
Henry Manchester.

Inventor:
James T. Brayton
By H. A. West
Attorney.

UNITED STATES PATENT OFFICE.

JAMES TOMLINSON BRAYTON, OF CHICAGO, ILLINOIS.

SIGHT FOR FIREARMS

SPECIFICATION forming part of Letters Patent No. 708,119, dated September 2, 1902.

Application filed May 18, 1901. Serial No. 60,798. (No model.)

*To all whom it may concern:*

Be it known that I, JAMES TOMLINSON BRAYTON, a citizen of the United States, and a resident of Chicago, in the county of Cook and State of Illinois, have invented certain new and useful Improvements in Sights for Firearms, of which the following is a specification.

My invention relates to sights for firearms, and particularly to sights of that class wherein lenses are employed to magnify the object aimed at, the object of my invention being to provide a sight which shall not invert the object aimed at or blur the front sight and which will not require any special nicety of adjustment upon the gun, and which will be universal in correcting such defects in eyesight as are likely to be met with in individual marksmen or sportsmen.

To these ends my invention consists, primarily, in a gun-sight comprising a double-convex lens mounted on the barrel and of sufficient focal power to converge parallel rays of light to or approximately to the point of the rear lens, the latter being a double-concave lens of sufficient power to render parallel the rays of light converged by the first-named lens, thus giving at all times a clear and unblurred view of the front sight and transmitting a clear and an erect image of the object aimed at to the eye of the marksman.

The invention also consists in combining with the sight above outlined means of adjusting the lenses to correspond to various imperfections or errors of refraction with which the marksman may be affected, whether from age or other causes; and the invention also consists of the construction, arrangement, and combination of parts, all as hereinafter described and claimed.

Figure 1:
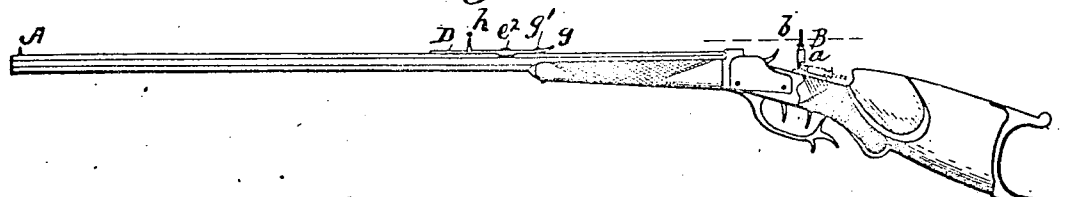
Figure 2:
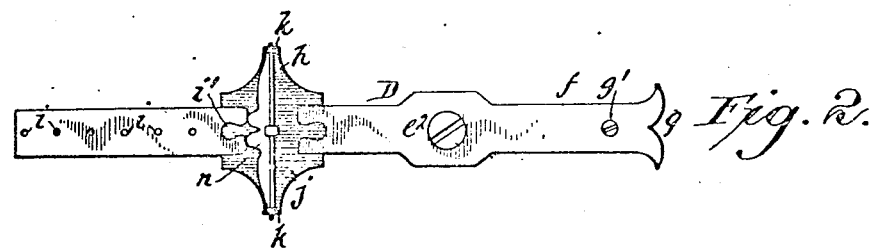
Figure 3:
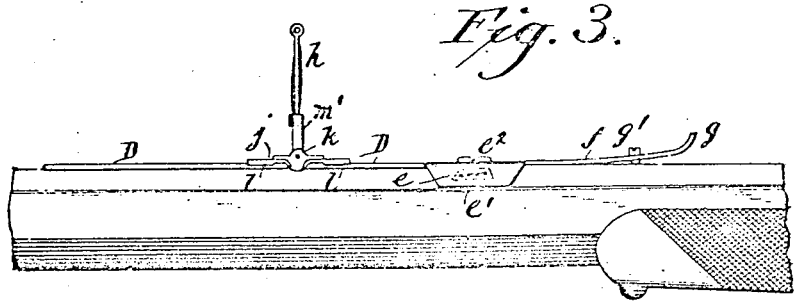
Figure 4:
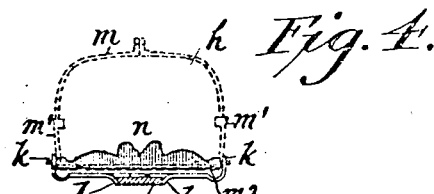
Figure 6:
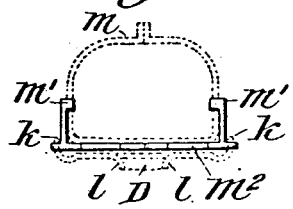
Figure 5:
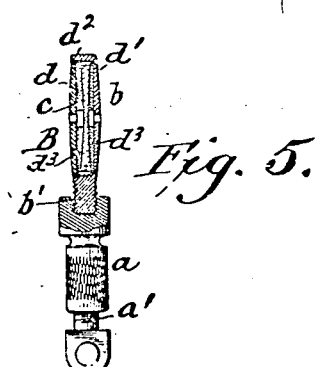

In the accompanying drawings, to which reference is made and which form a part of this specification, Figure 1 is a side elevation of a rifle having my invention applied thereto. Fig. 2 is an enlarged plan view showing one form of the barrel-sight as a whole in its preferred form of construction. Fig. 3 is a side view of the same located on the barrel; Fig. 4, an enlarged front view of the convex lens. Fig. 5 is an enlarged sectional view of the rear concave lens; and Fig. 6 is a detailed view of the pivoted or hinged frame, the main plate and lens-frame being shown in dotted lines.

A represents an ordinary bead or pin-head sight mounted at the muzzle of the gun, and B represents the rear sight, which is adapted to be tipped back to the position shown in dotted lines or elevated, as desired. It comprises a post $a$ and cup or eyepiece $b$, which carries a double-concave lens $c$. The cup or eyepiece, with its lens, is vertically adjustable for range and is detachable, so that it may be removed and replaced at pleasure. As here shown, the vertical adjustment is effected by a screw $a'$, which telescopes the post $a$, and the eyepiece is detachably connected to the post by a screw-shank $b'$ entering a screw threaded socket in the top of the post, as clearly shown in Fig. 5. I do not limit myself to this or to any special means for holding the eyepiece $b$, as various other means may be employed, all within the scope of my invention.

The eyepiece $b$, as here shown, consists of the annular and screw-threaded disk $d$ and the annular complemental cup $d'$, formed with an internally-screw-threaded flange $d^2$, to match the screw-threads on the edge of the disk $d$. The double-concave lens $c$ is provided with packing $d^3$, of felt or other suitable material, and is clamped firmly in the cup $b$ by screwing together the two parts thereof, or rather by screwing the disk $d$ into the flange $d^2$.

D represents a sight-plate secured to the barrel by a dovetailed groove $e$, headed nut $e'$, and screw $e^2$. The rear portion $f$ of this sight-plate is provided with an open crotch-sight $g$ and is adjustable vertically by a screw $g'$ or other suitable means for different ranges. On the said plate is mounted the double-convex lens $h$ of such power as to converge the parallel rays of light to the double-concave lens $c$. The lens $h$ is adjustable along the barrel to and from the lens $c$ and, as here shown, is connected to slide along the plate D, which latter is by preference formed with suitable detents $i\ i$, suitably spaced for different adjustments. These detents, as here shown, are small sockets or indentations made in the plate D, with which a small click $i'$ engages; but I may dispense with the sockets and click or other positively-acting devices and rely upon friction for retaining the lens at its various points of adjustment along the barrel. The means as a whole for holding the lens $h$ is composed of a bridge-piece $j$, formed with short upturned lugs $k\ k$ at its ends and formed at the bottom with lips $l\ l$, struck down from the material of the bridge $j$ to embrace the edges of the plate D, as shown in Fig. 4. The spring-click $i'$ is by preference formed as a part of the central portion of the bridge. The lens $h$ is set in a metal frame $m$, similar to the frame of an ordinary eyeglass, which is slipped into place between the retaining arms or clamps $m'\ m'$, which are made as a part of a plate $m^2$, which is pivoted or hinged in or to the short upturned earpieces or lugs $k\ k$, so that the sight may be tipped down to a horizontal position when the gun is to be aimed with open sights. If desired, the plate $m^2$ may be formed or provided with an open sight $n$ at right angles to the lens $h$, in which case the crotch-sight $g$ may be omitted. The breech-sight B, having the small peep-orifices, is, in effect, an ordinary sight plus the double-concave lens, and with this the sight $g$ need not be used unless desired; but if the peep-sight were omitted the sight $g$ would be necessary for accurate aim.

Inasmuch as no nicety of construction or adjustment need be applied to the sight or lens $h$, I do not limit myself to any special means of attachment, except in such claims as are drawn to specific means. As here shown, the sight $h$ may not only be adjusted along the barrel for range and defective eyesight, but it may be detached from the gun and replaced, so that the hunter may carry it in his pocket out of harms way and place it on the gun at the moment, if needed.

While I have shown the diminishing-lens to be of the double-concave order and the magnifying-lens to be of the double-convex order, I do not limit myself to such types of lenses, as the known equivalents of these lenses may be used in place of the specific forms shown.

Having thus described my invention, what I claim as new, and desire to secure by Letters Patent, is—

1. The combination with the front sight and a double-concave-lens sight at the breech, of a plate mounted on the barrel, a bridge adjustably connected to the said plate, a frame hinged to said bridge and a double-convex lens held in said frame, substantially as described.

2. A plate mounted upon the barrel, a bridge mounted to slide along said plate, detents for locking the said bridge to said plate and a double-convex lens mounted on said bridge, substantially as described.

3. The combination with the front sight and a double-convex-lens sight at the breech, of a bridge adjustably mounted on the barrel, a frame hinged to said bridge and a double-convex lens held in said frame.

4. The combination with the front sight and a double-convex-lens sight at the breech, of a bridge adjustably mounted on the barrel, a frame hinged to said bridge, said frame being provided with spring-clamps for holding a double-convex lens, substantially as described.

5. In a sight for firearms a bridge adjustably mounted on the barrel, a tilting frame hinged to said bridge, a double-convex lens held by said tilting frame and an open sight adjacent to said tilting frame, substantially as described.

JAMES TOMLINSON BRAYTON.

Witnesses:
A. NUTTING,
H. D. JAMESON.